(12) United States Patent
George-Svahn et al.

(10) Patent No.: US 9,797,777 B2
(45) Date of Patent: Oct. 24, 2017

(54) SEQUENTIAL MARKER PLACER

(75) Inventors: Erland George-Svahn, Solna (SE); Torbjörn Johansson, Danderyd (SE)

(73) Assignee: FLIR Systems AB (SE)

( * ) Notice: Subject to any disclaimer, the term of this patent is extended or adjusted under 35 U.S.C. 154(b) by 835 days.

(21) Appl. No.: 13/436,762

(22) Filed: Mar. 30, 2012

(65) Prior Publication Data

US 2012/0249800 A1     Oct. 4, 2012

Related U.S. Application Data

(60) Provisional application No. 61/470,225, filed on Mar. 31, 2011.

(30) Foreign Application Priority Data

Mar. 31, 2011   (EP) .................................. 11160732

(51) Int. Cl.
*H04N 5/33*     (2006.01)
*G01J 5/02*     (2006.01)
*G01J 5/00*     (2006.01)

(52) U.S. Cl.
CPC ................ *G01J 5/02* (2013.01); *G01J 5/025* (2013.01); *G01J 5/026* (2013.01); *H04N 5/33* (2013.01); *G01J 2005/0077* (2013.01)

(58) Field of Classification Search
CPC ..... G01J 5/025; G01J 2005/0077; H04N 5/33
See application file for complete search history.

(56) References Cited

U.S. PATENT DOCUMENTS

| | | |
|---|---|---|
| 6,606,115 B1 | 8/2003 | Alicandro et al. |
| 2002/0172410 A1* | 11/2002 | Shepard ................ G01N 25/72 382/141 |
| 2003/0012253 A1* | 1/2003 | Pavlidis ................ A61B 5/164 374/45 |
| 2004/0260513 A1* | 12/2004 | Fitzpatrick et al. ......... 702/182 |
| 2005/0275636 A1* | 12/2005 | Dehlin et al. ................ 345/173 |
| 2006/0289768 A1 | 12/2006 | Vallese et al. |
| 2007/0087311 A1 | 4/2007 | Garvey, III et al. |
| 2009/0009806 A1 | 1/2009 | Matsuda |
| 2009/0050806 A1* | 2/2009 | Schmidt et al. .............. 250/332 |
| 2011/0012719 A1* | 1/2011 | Hilger et al. ................ 340/435 |

* cited by examiner

*Primary Examiner* — Zhubing Ren
(74) *Attorney, Agent, or Firm* — Haynes and Boone, LLP

(57) ABSTRACT

A method for marking and analyzing at least one object in an IR image, for an embodiment, comprises receiving an image of an object scene comprising at least one object, receiving a first input control signal indicating pixel coordinates of a first selected object scene portion, locking a first marker of a camera on a first object region corresponding to said pixel coordinates in said object scene in response to said first input control signal, wherein said input control signal is generated by a user activating an input means by a single action. The invention for various embodiments also relates to an IR camera, a computer program product and an image processing system comprising such an IR camera.

20 Claims, 6 Drawing Sheets

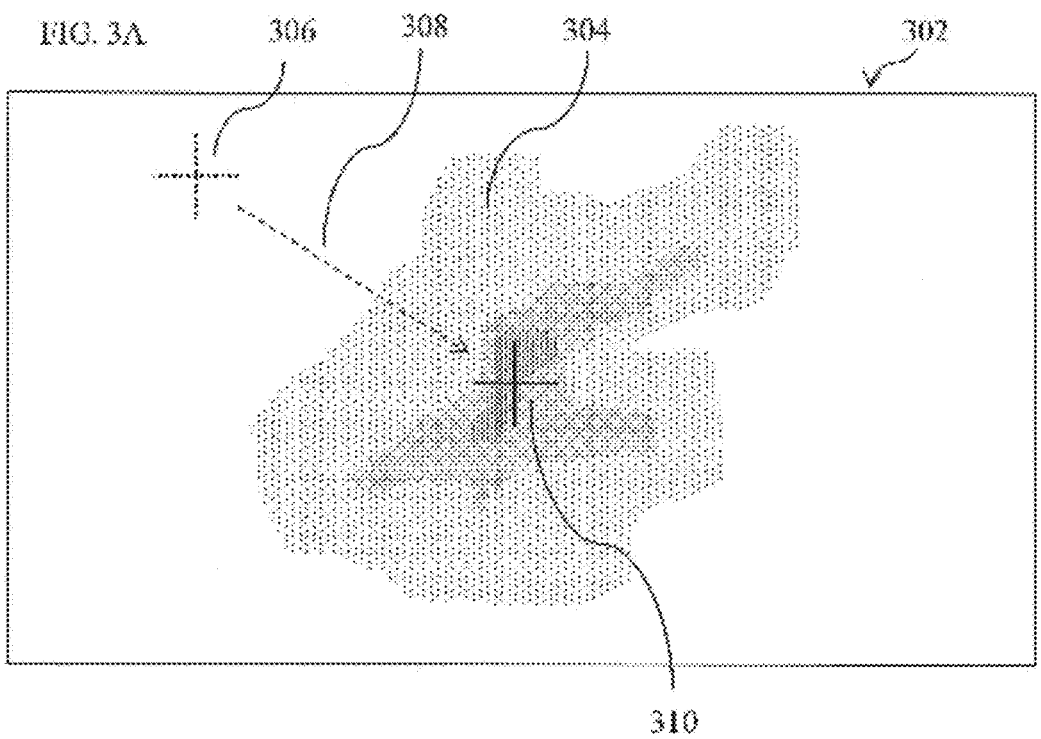

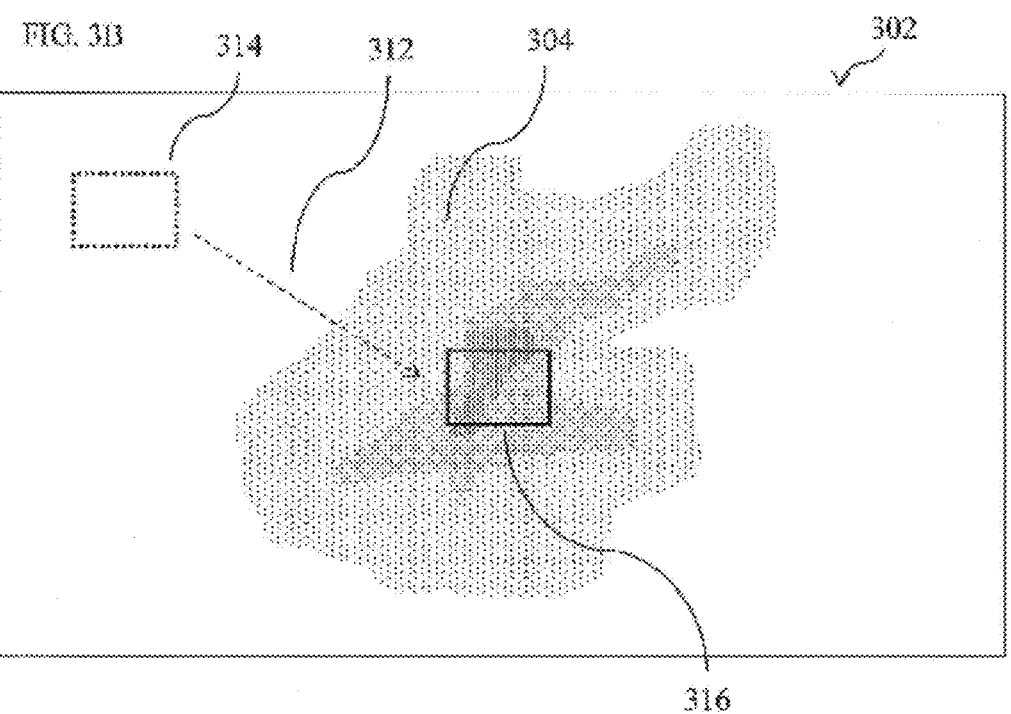

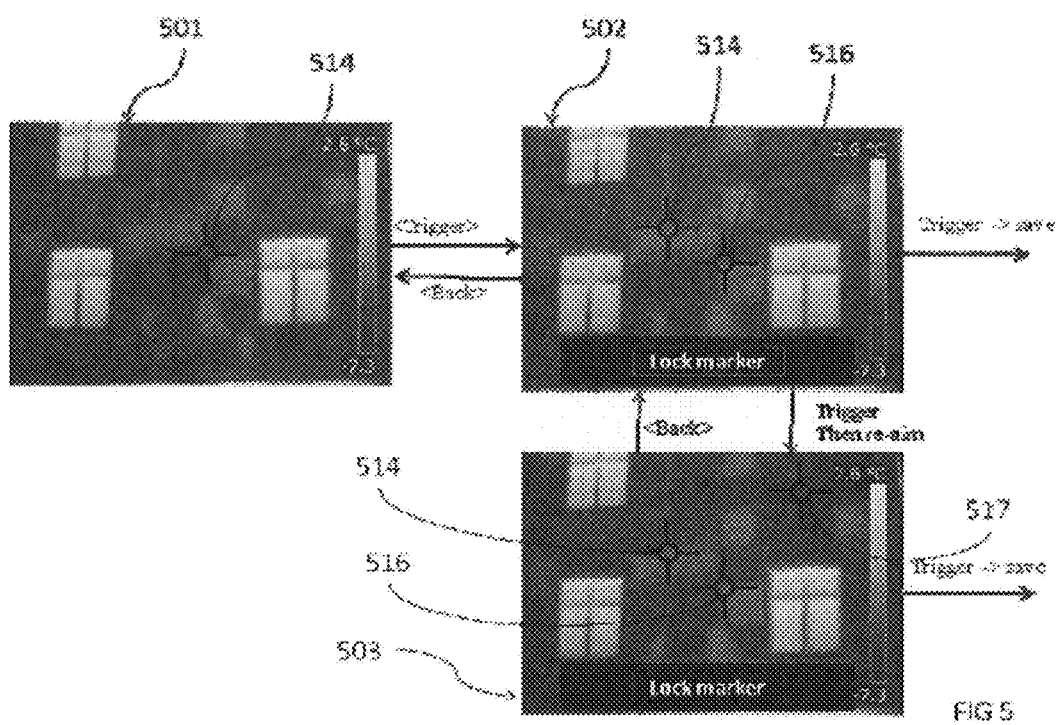

SEQUENTIAL MARKER PLACER

CROSS-REFERENCE TO RELATED APPLICATIONS

This patent application claims priority to and the benefit of U.S. Provisional Patent Application No. 61/470,225 filed Mar. 31, 2011 and EP Patent Application No. 11160732 filed Mar. 31, 2011, which are incorporated herein by reference in their entirety.

TECHNICAL FIELD

One or more embodiments of the present invention relate to the technical field of marking and analyzing a sequence of objects in an infrared (IR) image by locking a marker of a camera on a region in response to a control signal.

BACKGROUND AND PRIOR ART

The use of thermal or infrared (IR) images for determining parameters, often a temperature, of an object is well-known in the art. Often, an IR camera is used at a location where a plurality of objects are present, and by capturing images of said objects their individual temperatures can be determined from the resulting image or images. By creating a large series of images during operation of the IR camera, the user can see the object scene presented to the camera in close to real time, and when the camera is moved in relation to the objects displayed, the movement can be seen in the images shown to the user.

Often, the user intends to determine the temperature of one or more of the objects in the object scene, and this can be crudely measured by watching the images created and evaluating roughly what temperatures specific displayed colors correspond to, in order to arrive at a general idea. For a more accurate measurement, the user can generally maneuver a user interface, for instance by selecting options in menus displayed by the camera or moving a marker or the like to select a specific point in the image and reading a temperature measurement somewhere on the camera. The process of arriving at such measurements is generally time-consuming and requires multiple step selection processes where different input is given such as pressing buttons or scrolling an image before a measurement can be read. The placing of markers frame by frame in a series of live or still images is generally known in the art.

Sometimes, however, the user is operating the camera in an environment where such lengthy procedures are unsuitable, such as environments where the user can only be present during a short period of time. There can for instance be an unpleasant location due to chemical substances or radiation that are harmful to a human, and where protective equipment such as gloves make the interaction with a camera increasingly difficult.

An available option can be to save the images created by the camera to a memory unit and performing a thorough analysis later, using the camera itself or a computer or other processing unit with a suitable software program. This has the advantage of eliminating the problems described above, but if the measurements are required for performing an operation on the location, the user will have to return to this location after the analysis has been performed and finish the tasks there. This can present any number of problems, however, when speed and accuracy is important and the wait for the measurements to be completed can be unacceptable.

Known examples of prior art are shown by US Patent 20070087311 (Garvey) and by US Patent 20060289768 (Vallese), where systems for marking at least one area of an image are shown. A further example of prior art is found in the patent document U.S. Pat. No. 6,606,115 B1. None of these documents, however, address the problems mentioned above.

There is therefore clearly a need for a more efficient manner of marking objects in an image of an IR camera and performing measurements on said objects, in order to avoid the problems described above.

SUMMARY

One or more embodiments may achieve a more efficient manner of marking objects through a method of marking and analyzing a sequence of objects in an IR image according to the preamble of the appended claim 1, wherein the input control signal is generated by a user activating an input means by a single action. Thereby, it is possible for a user of the camera to mark an interesting object by a single interaction, such as pushing a button or touching a touch screen, in a simple and convenient manner, allowing for an easy operation of the camera without the requirements of operating a plurality of buttons or scrolling tools and thus being easily operable even during difficult conditions and under time constraints.

After at least one object has thus been marked, measurements of a parameter of a location of a first marker are used for determining a difference in said parameter between a first marker and a second marker, or between said first marker and a reference value. Thereby, a simple and reliable measurement can be performed, and parameter data regarding a first and second marker can be analyzed and compared with each other and/or with a reference value stored by a camera. Preferably, said parameter represents a temperature.

According to further one or more embodiments, a number of external inputs can be given to the camera by external measuring devices connected to the camera by connecting means, and a combined analysis of external data and of temperature data gathered by the camera can be performed. Other measurements and/or calculations such as radiance, moisture, area or geometrical distances between marked regions or points in said image or between an object and the camera can also be performed.

Analysis of gathered data can be performed at a measuring site but can also be performed at a later time, giving the user the opportunity for more complex analysis using data gathered by the camera as well as data gathered by external devices.

Additional advantages and applications of one or more embodiments of the present invention will be disclosed in the following detailed description.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3A shows an example of various ways for a user to select an object in a thermal image frame using a position marker according to one or more embodiments.

FIG. 3B shows an example of various ways for a user to select an object in a thermal image frame using a rectangular area marker according to one or more embodiments.

FIG. 4 and FIG. 5 show examples of configurations and use case examples according to one or more embodiments.

DETAILED DESCRIPTION

General Function of an IR Camera

Figure 1:
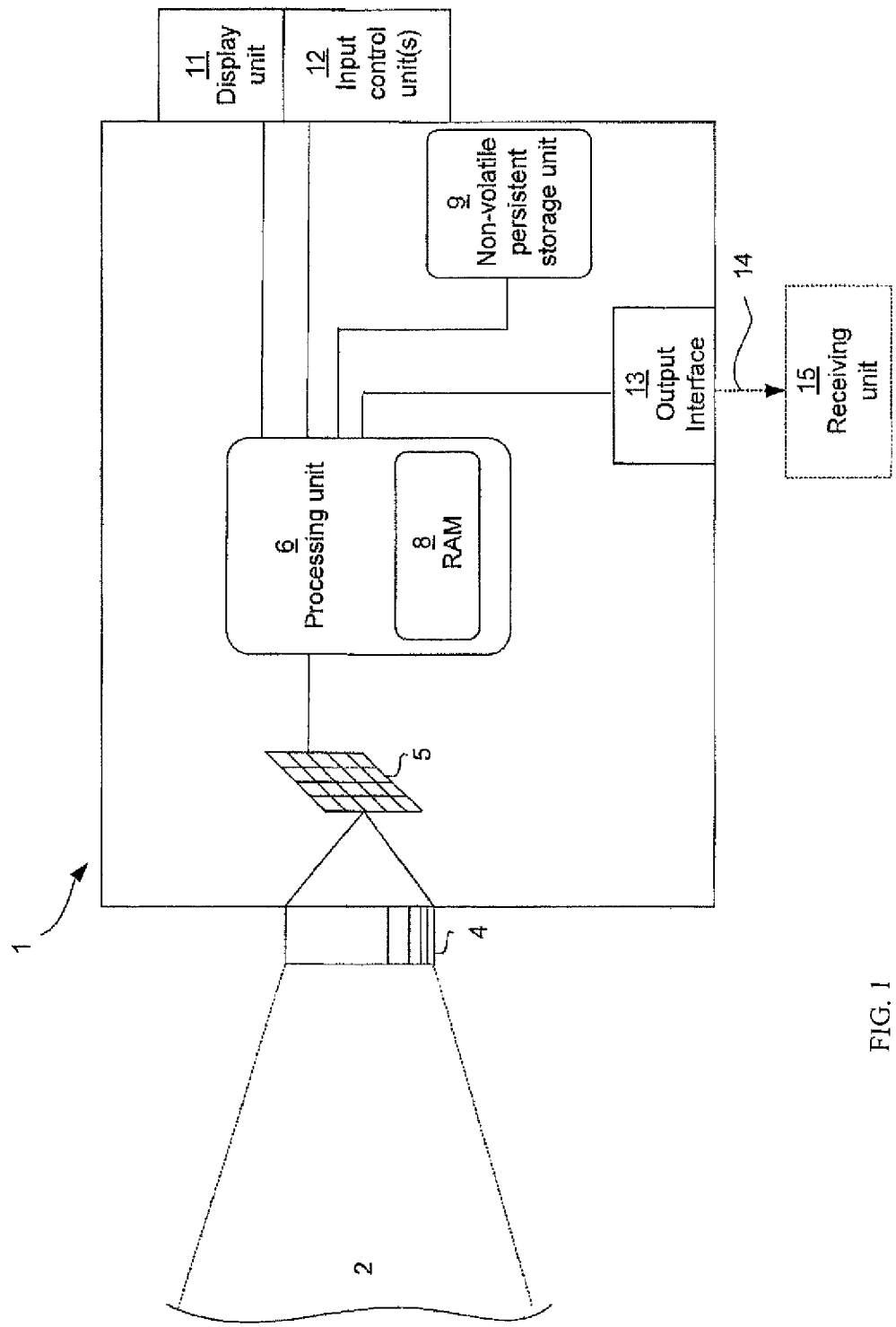
FIG. 1 shows a schematic view of an IR camera suitable for use with or to configure with one or more embodiments.

FIG. 1 shows an IR camera 1 for capturing thermal radiation of an image of an object scene 2, where a plurality of objects in said object scene can be displayed through emitted thermal radiation from each object, as is well-known in the art. Said radiation is captured by a lens assembly 4 focusing radiation onto a detector element 5 where a radiation amount from each part of said image is registered and data is transmitted to a processing unit 6. The detector element 5 may typically be a matrix of detector elements, each of which may detect radiation from an area of the image, and may be arranged to extract radiometric information from the thermal radiation. As understood herein, the terms IR camera and IR image means a camera and image, respectively, where thermal radiation is captured and displayed. Said radiation is often in the infrared spectrum, but other wavelengths may also be used and are understood to be incorporated herein.

The processing unit 6 may for instance be a field-programmable gate array (FPGA) and can be connected to a volatile buffering memory unit 8 arranged to temporarily store radiometric information. Said memory unit 8 can typically be a random access memory unit (RAM).

Also connected to the processing unit 6 is at least one input control unit 12 for transmitting input control signals and thereby control at least one aspect of operation of the processing unit 6. Said input control signals can be generated by a user handling the camera 1 but can also be determined by another processing unit or the like. Through display means 11, also connected to the processing unit 6, data can be displayed to a user, generally by processing radiometric data captured through the lens assembly 4 and detector element 5 to present an image in order to show the user an image of the object scene 2 and temperature variations present in said object scene 2.

The camera 1 further comprises a non-volatile persistent storage unit 9, also connected to said processing unit 6, for storing temperature data captured by the camera 1 in the manner described above. An output interface 13 connected to said processing unit 6 can also be provided and can transmit data via a connection 14 to a separate receiving unit 15.

During operation of the camera 1, a series of images can be captured, displayed to the user in a live feed in said display unit in order to allow the user to observe the image of the object scene 2 and to interact via the input control unit 12 with the processing unit 6 for performing different operations. The captured data can be stored in the storage unit 9 for further processing and/or viewing at a later time, or can be transmitted from the camera via said output interface 13 to the receiving unit 15 where the captured data can also be viewed and/or processed, either during said operation of the camera 1 or afterwards.

The camera 1 described above can be used with the invention in the manner described further below, as will become readily apparent to the person skilled in the art.

Various Embodiments

Figure 2:
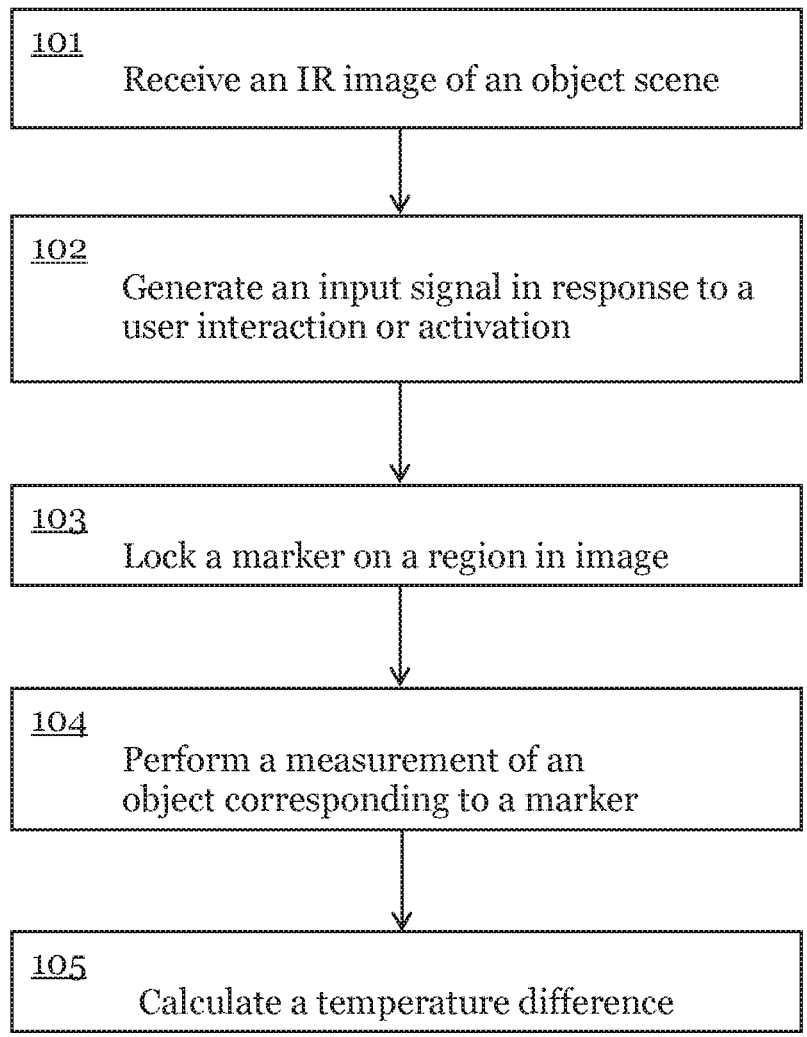
FIG. 2 shows a schematic view of the method steps according to one or more embodiments.

In FIG. 2, method steps for performing the method of marking and analyzing a sequence of objects in an IR image according to an embodiment of the invention can be seen. Said IR image can be a live image sequence as well as a single frame. In a first step 101, an IR image of an object scene 2 is received by a processing unit 6 of a camera 1, typically by thermal radiation emitted by objects on said object scene 2 being captured by the camera 1 by means of a lens assembly 4 and detector element 5, as described above. Said object scene can be a location where a number of objects are present and where an analysis of a temperature or other parameter of a selection of said objects is to be performed, such as a comparison of the temperatures of two separate objects or of one object with a reference value, or where another parameter is to be analyzed, such as a distance between objects for instance. A user generally moves the camera 1 to aim at a specific object or objects that are of interest, and generates a first input control signal as described below and in accordance with one or more embodiments by for example a single action such as pressing a button or touching a touch screen. Thanks to the use of a single action only, the camera 1 of such embodiments can be handled quickly and reliably, without requiring selection of actions in a series of menus or the like, and without requiring the pressing of a number of buttons in succession. The camera 1 can thereby be handled even when heavy gloves are used or where speed is of the essence due to a hazardous environment. A single action is defined herein as an interaction with the camera 1 wherein only one input is given, for instance in the form of pushing a single button. In this text such a control signal is also called a trigger and the action of inputting such a control signal is also called to trigger.

In a second step 102, a first input control signal is thus received by a processing unit 6, typically by a user interacting with or activating an input control unit 12, such as by pressing a button or touching a touch screen, or by operating a joystick or remote control connected electronically to said IR camera, for instance. In a response to said first input control signal, in a third step 103 a first marker is locked on a first region, area or point in said image. The first input control signal for example specifies the location where the marker is to be locked by indicating pixel coordinates of a first selected object scene portion corresponding to said location. A region, area or point as understood herein is a specific region, area or point in an image where measurements can be performed, and pixel coordinates denote a specific point in an image corresponding to thermal energy registered by a specific detector element, as is also well-known in the art.

In one embodiment, the display unit 11 can display a first marker that is located at a specific place, for instance at the center of the display window, and by activating an input control for example by pushing a button said first marker is fixed or locked onto a region of interest, comprising one or more pixels, identified by a user in the IR image located at the same place as the marker in the image. The region of interest identified by the user may for example indicate a certain temperature, a temperature pattern, a hot spot or a cold spot, an object, a part of an object or a part of the scene being of specific interest to the user. In accordance with one or more embodiments, when a marker has been locked onto a region of interest, tracking may be commenced. The tracking algorithm will typically identify an object based on IR data within the marked region of the interest. In one or more embodiments of the invention, the tracking method tracks an object in a thermal image frame sequence, based on parameter data such as for example intensity values dependent on the color and/or temperature information in an imaged scene. The tracked object may for example be defined as a plurality of pixels forming a continuous or discontinuous area having a specific identified temperature data pattern. A tracked object in this sense is not to be confused with an object imaged in a visible light image frame that is more likely to correspond to a real world object.

As the camera is subsequently moved in relation to the object scene, the first marker remains fixed to the tracked object. If a touch screen is used, a marker can according to one or more embodiments be created in or moved to a location in the image where the screen is touched. After the first marker has been locked, the user can move the camera 1 in relation to the object scene while the first marker remains fixed onto the object where it has been placed, tracking said object. This is achieved by any suitable tracking algorithm, for instance a shape based tracking algorithm known in the art. Other kinds of tracking algorithms for keeping track of a location of an object in an image are also conceivable.

In a fourth step 104, a measurement of a first temperature of an object corresponding to said first marker is performed and in a fifth step 105 that is optionally present in one or more embodiments a temperature difference between said first temperature and a second temperature of a second marker on said object scene 2 is calculated. The second marker can be located in any part of the image displaying the object scene 2, for instance in a centre of the image or in another predetermined location, or can be chosen by a user by interacting with the input control unit 12. A temperature difference can also be calculated between the first temperature and a reference value stored in the camera 1.

If desired and as provided in one or more embodiments, the second marker can be locked in a manner similar to that of the first marker, i.e. by the first, second and third steps 101, 102, 103 of the method being repeated in such a way that a second region, area or point is marked by a fixed marker. The first temperature can for example be compared with a second temperature corresponding to said second marker, and either or both of the first and second temperatures can be compared with a stored reference value.

When using the method according to one or more embodiments of the invention, more than two markers can of course be placed and measurements be performed on a plurality of markers denoting a plurality of objects. Said measurements can be performed directly while the camera 1 is being operated in a vicinity of the object scene, or can be performed at a later time. In some applications as provided for in one or more embodiments, it may be beneficial to store a number of images with or without markers in a non-volatile persistent storage unit 9 connected to the camera 1 and to perform temperature measurements or other calculations in a separate processing unit such as a computer or a smart phone, for instance, to which the information stored in the storage unit 9 has been transferred. It may also be beneficial to integrate said processing unit with the IR camera 1 itself to allow for more complex processing on site. The camera 1 is in one or more embodiments arranged to automatically store an image together with markers after a certain number of markers have been placed. Generally, it is beneficial to perform the measurements in such an image, so that the parameter of a given marker can be compared with the parameter of another marker present in the same image.

When placing markers, a number of different techniques can be used within the scope of the present invention. In one embodiment, a first marker, for instance in the form of crosshairs, can be placed in a suitable location such as a centre of the display, as has been described above. When desiring to place said first marker at a first object on the object scene, the user can move the camera 1 until the marker is aimed at the first object, and by pushing a button or the like, said first marker is locked to that object and a second marker is created in the image. When the camera 1 is subsequently moved in relation to the first object, said first marker will remain on the first object by means of a tracker algorithm allowing a tracking of a specific object after marking. When desiring to mark a second object, the user can move the camera 1 until the marker is placed on the second object. In another embodiment, the first marker can for instance be an area with an automatic hot spot finder within that area, i.e. finding a point with the highest temperature in said area. When a hot spot is found and the user pushes a button or the like to interact with the input means, a single point marker may be created as a first marker at the location of the area marker's hot spot, and another aiming area marker remains. In another embodiment, the user can use a touch screen to place a first marker at a first object in any part of an image created by the camera 1 and displayed to the user, and can place a second marker by pointing to another object shown in the image. The user is generally not confined to a first and second marker only, but can place any number of markers by repeating some or all of the first, second and third steps 101, 102, 103 as desired, and in the fourth and fifth steps 104, 105, analysis and measurements of a desired number of the markers can be performed as is suitable in the present application. Thanks to the invention, the user can thereby place markers and track objects in an image in a convenient and reliable manner, requiring few interactions with the camera.

The different ways of marking objects described above can optionally also be combined, so that a touch screen function is integrated with a marker, giving the opportunity of letting a marker track an object by touching the screen, for instance.

The marker can be in the form of crosshairs or a shape marking an area in the image, such as a box or circle, for instance. Many other shapes and configurations are of course also possible. If the marker forms an area, it can be possible to detect specific points within that area, such as the pixel with the highest temperature for instance.

In an especially beneficial embodiment, the method according to an embodiment of the invention can be used to lock markers and save a resulting image requiring only few actions by the user. Thus, the first control signal given by a first action by the user can lock the first marker to a desired object in the image, and at the same time create a second marker placed at a predetermined location in the image, such as the center of the image as also described herein. Measurements can now take place between the point or area marked by the first marker and the point or area where the second marker is located, although the second marker is not yet locked to an object but will be moved continuously as the camera is being moved to remain in the center of the image.

The user can aim the camera as desired and produce a third control signal to lock the second marker to a desired point or area, and in this embodiment the third control signal is also arranged to freeze the image, so that this image is continuously displayed by the display means 11 at the time of locking the second marker, or to store the image together with the two markers, or both. By storing the image, further processing at a later time is possible. The stored image comprises the visual image displayed in the display means 11 and the locations of the markers, but also comprises radiometric data regarding each pixel of the image, and it is beneficial to use these data rather than the visual image when measuring and performing calculations at the markers in the image.

In this embodiment, said third control signal is given instead of said second control signal. Thus, the effect is that the second action performed by the user also serves to freeze or store the image. In another embodiment, the first control signal can also be configured to perform this operation, or it can be required that the user place a higher number of markers before a freezing and/or storing of the image is performed. It is of course also possible to use a separate control signal for the freezing or storing operation, and by using a menu system or a pre-programming, the user can be allowed to design the operation of the camera 1 to select which control signals are used merely for placing a marker and which are used also for storing or freezing images, or for other suitable operations associated with the method.

Also disclosed by one or more embodiments of the invention is an IR camera 1 similar to that described above, comprising suitable functional means for performing the steps of one or more embodiments of the method described herein. Said functional means can be code portions for execution by the processing unit 6 and for allowing elements such as lens assembly 4, detector element 5, display unit 11 in the form of a screen or the like, input control unit 12, for instance in the form of a touch screen or at least one button allowing a user to interact with the camera 1, and a storage unit 9 for storing data recorded by the camera 1, to communicate with each other for performing the steps of the method. An output interface 13 can allow data to be transmitted to an external receiving unit 15.

Thus, when said input control unit 12 receives a first input control signal, at least one code portion, preferably comprised in said processing unit 6, executes a placement of a first marker on a first area or point and allows for said first marker being shown in an image displayed in said display unit 11. When the camera 1 is subsequently moved in relation to the object scene 2, said first marker can be displayed tracking an object in the object scene 2 corresponding to the placement of the first marker in the third step 103 of the method. Any number or additional markers can be created in a similar way and parameters such as temperature, geometrical distances or the like can be measured as described above, still by suitable code portions of the processing unit 6 executing suitable processes involving the camera 1 and its elements.

Said camera 1 can be part of an image processing system where a number of IR images can be captured, marked and analyzed, either during operation of the camera 1 as images are captured or after said operation, when more thorough analyzes can be performed on recorded data.

Data saved in the camera 1 can be saved as radiometric data and allow for subsequent analysis of said data, allowing for a more detailed analysis and a higher data resolution. The term radiometric is to be understood herein as a unique mapping between a data value of each pixel of an image and a temperature of an object as measured by a detector element of the camera 1. Thus, each data value comprised in a radiometric IR image corresponds to one and only one temperature value of an object scene 2.

It can be made possible for a user of the IR camera 1 to arrange his or her interaction with the camera 1 in a suitable way, so as to determine for instance if the markers are to be located in a specific place, such as in the centre of the image, or if they are placed by the user as desired. Many other adaptations are also possible within the scope of the appended claims.

In FIGS. 3A and 3B, various examples of ways for a user to select an object 304 in a thermal image frame displayed on a display 302 connected to a thermal imaging device, using a spot marker 310 or an area or region marker 316 are shown.

In one embodiment according to FIG. 3A, a position marker 310, in this example formed as a hair cross (or crosshair), is located in the center of a display 302 connected to a thermal imaging device, and the user "aims" at the object 304 by moving the thermal imaging device until the center position marker 310 is located on the object 604 that the user wants to select. When the position marker 310 is in the correct position, the user uses an input means (not shown in the figure) for generating a control signal, on the thermal imaging device or communicatively connected to the thermal imaging device, to place the position marker 310 on the object 304, thereby indicating the selection of an object associated with the position of the position marker 310. The input means could for example be buttons, menus, touch interaction, remote control or any other suitable input means.

In another embodiment according to FIG. 3A, a movable position marker 310 is located anywhere on the display 302 connected to a thermal imaging device. The user moves the position marker from its original position 306 to a location on the object 304 that the user wants to select, using input means (not shown in the figure), on the thermal imaging device or communicatively connected to the thermal imaging device. The input means could for example be buttons, menus, touch interaction, remote control or any other suitable input means. When the position marker 310 is in the correct position, the user uses a second input means (not shown in the figure), on the thermal imaging device or communicatively connected to the thermal imaging device, to place the position marker 310 on the object 304, thereby indicating the selection of an object associated with the position of the position marker 310. The input means could for example be buttons, menus, touch interaction, remote control or any other suitable input means.

FIG. 3B shows embodiments very similar to those in FIG. 3A, where an area marker 316, here a rectangular area marker, is used instead of a hair cross position marker.

In order to enable tracking of objects in an imaged scene, the method of one or more embodiments of the present invention includes the use of an object identification method and a tracking method.

A tracking method identifies and tracks objects in a sequence of image frames. The tracking method used in the method of an embodiment of the present invention may be any known tracking method that is suitable for tracking an object in an image. For example, tracking may be performed by a filtering algorithm, using filters such as feature tracking filters, correlation filters, Kalman filters or particle filters.

A particle filter places a finite number of particles (position/area markers) that are not displayed to the user, in connection with the position/area marker placed by the user. The highest concentration of tracking method generated particles is in the area closest to the user placed position/area marker. For every frame, the particle filter uses parameter data, such as temperature data, color data, radiance data, intensity data, correlation, difference vector data and/or movement data from the current frame as well as from a number of previous frames in order to predict the movement pattern and parameter data change pattern of the tracked object.

The measurements that can be performed on the objects marked by markers are as also explained above not limited to temperature measurements only, but can also comprise other data such as a geometrical distance between objects marked by a first and a second marker, or a distance between one object and the camera 1 itself, for instance. The camera 1 can also comprise connection means for connecting with an external measuring device, such as a device for measuring properties such as a current, voltage or resistance, or a device for measuring humidity, for instance. Thereby, suitable properties of one or more objects or of a specific area or section of an object can be measured and data from such measurements can be transferred to the camera 1 via said connection means and be used for analysis together with data gathered by the camera 1 itself through captured images. When using the method according to an embodiment of the invention for measuring a temperature, said measurements can be used for calculating other properties of the objects depicted in the image of the object scene as well. For instance, by combining temperature measurements of a cable with measurements of a load on said cable, it is possible to determine whether the temperature is excessive and may be an indication of damage or risk of future damages to said cable.

Besides temperature and geometrical distances, thermal imaging can typically be used to measure radiance, humidity/moisture, or the area of an object.

Humidity/moisture measurements are typically performed in order to find moisture damage in buildings. If the temperature and humidity of the surroundings are known, the humidity of/moisture in an area in a thermal image frame can be derived, as is well known to a person skilled in the art.

The area of an object is typically measured in a thermal image frame sequence to see if an area comprising a certain temperature or radiance interval in the image is increasing or decreasing in size, to see for example if heat is spreading in the imaged scene. If the distance to an object in a thermal image frame is known, the area of the object can be derived, as is well known to a person skilled in the art.

Further Embodiments and Use Case Examples

Figure 4:
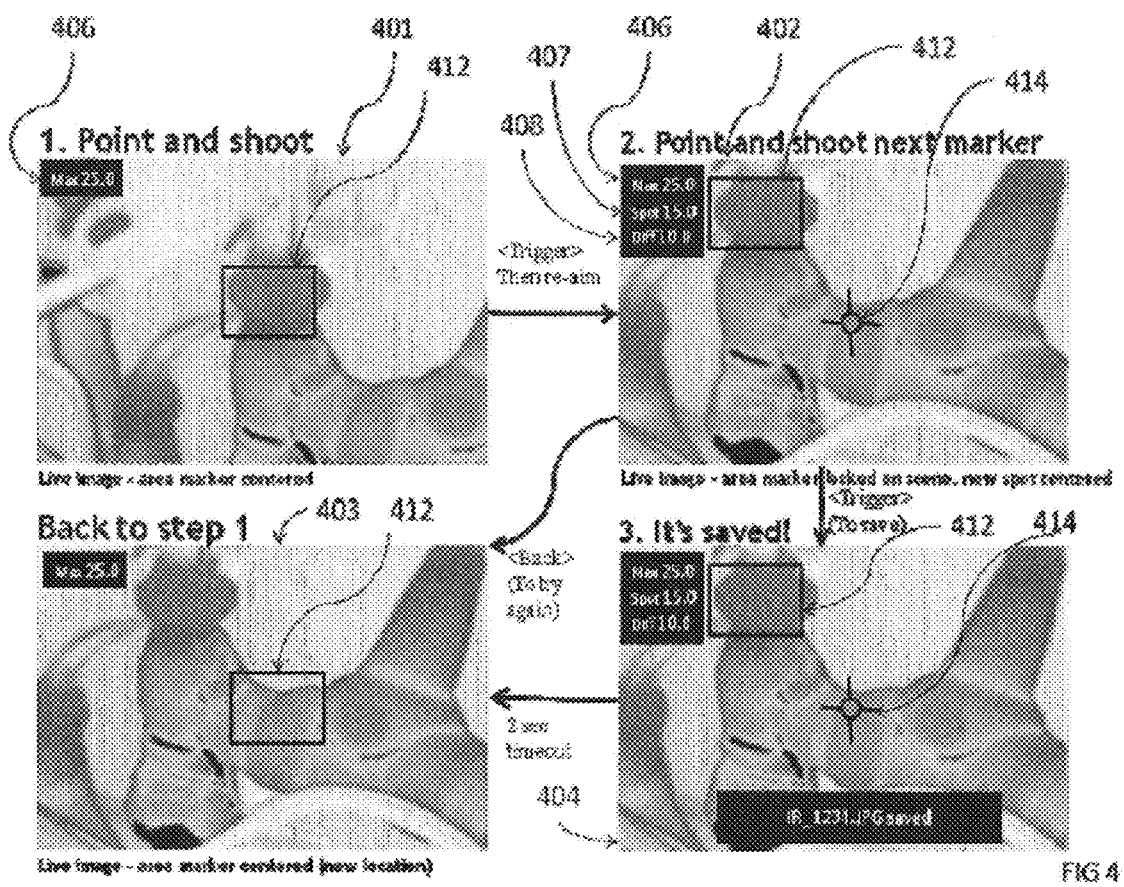

FIG. 4 illustrates functions of one or more embodiments by way of a use case example. In a first step 1a user of a camera 1 depicts an object scene and a first live image 401 is presented on a display. An area marker 412 is according to one or more embodiments by default placed at a predetermined location in the image, for example in the centre of the image 401 as illustrated in FIG. 4. At the upper left corner of image 401 there is provided a first indication 406 of a temperature, for example a maximum temperature identified by functions realized in the camera. In this example, the max temperature is found within the area of the area marker 412. Alternatively, in one or more embodiments, the first indication 406 pertains to a temperature within the area marker, for example maximum or average temperature within the area marker 412. The area marker is locked on the area of interest in the image in response to a trigger being activated by the user inputting a control signal as explained above in this description. According to one or more embodiments, an object is identified based on the area of interest and tracked from frame to frame in the live image sequence.

Then in a second step 2 the user re-aims at a second region of interest in the image by pointing a second marker 414, here for example a spot marker in the form of a hair cross (also referred to as a crosshair), on the second region of interest. A second live IR image 402 is presented on the display. At the same time there are indications provided that indicate said first temperature indication 406 of the area marker 412, a second temperature indication 407 that indicates the temperature in the spot marked by the second marker 414 and a calculated value 408 dependent on the temperature value of the first marker and/or of the second marker. The calculated value 408 is in this example the difference between the first temperature indication value 406 of the first marker and the second temperature indication 407 of the second marker.

In a third step 3 the user again activates a second trigger by inputting a control signal, which is one or more embodiments for example corresponds to the same or a similar action as when locking the first marker. In response to this second trigger the live image 402 is frozen with the first and second markers indicated on the image as well as a selection of the first, second and third temperature indications is saved and stored in a memory.

As an alternative to saving the marked image, the user may instead input a control signal enabling the camera to go back to the mode of the first step 1 and aim the area marker 412 at a new region of interest at a new location in the IR image 403. In one or more embodiments there is provided a predetermined or selectable time out period, for example lasting 2 seconds. After an image has been saved in the third step 3, the camera is configured to return to the first mode, or the mode of step 1, after the time out period has passed.

In one or more embodiments, the camera is configured to go into the described marker mode in:
  response to the activation of a predetermined trigger or control signal input, for example via a specific button or menu; or
  in response to a long trigger action, i.e. in response to an input of a trigger control signal lasting a predetermined time.

Further, one or more embodiments are configured with a reversing or back function realizing backward step and undo functions, for example by means of a dedicated key.

FIG. 5 illustrates functions configured in further of one or more embodiments that enable marking and tracking of a plurality of regions, areas or points in a manner similar to the manners in the previous description. In FIG. 5 a first live IR image 501 is displayed in a first step, a first marker 514 in the shape of a hair cross is situated in a predetermined location in the displayed image, for example in the centre of the image.

The user triggers the locking of the first marker on an object in the IR image aimed at with the hair cross marker.

In a second step a second live IR image 502 is displayed. The first marker 514 is locked to and tracks the first selected object of the IR image and a second marker 516 is now placed in the centre of the image and used to aim at a second object. In this step the user may choose to undo the last action and thereby go back to the first step in response to inputting an undo or back control signal or trigger the saving of the current image in response to input of a save control signal.

As an alternative to saving the image 502 in the second step, the user may trigger the locking of the second marker to a second object in the second live IR image 502 and have a third IR image 503 displayed with a third marker 517 to aim and lock on a third object. Again a back function and save function are enabled in a manner as described above.

One or more embodiments are configured to enable tracking of a predetermined number of markers and marked objects in the IR image. The number of markers and marked objects that are possible to track depends on the implementation. In one or more embodiments the trigger control signals are input via a touch screen display. One or more embodiments are configured to enable a user to for example use a finger, a stylus or the like to tap on selected objects on a touch or pressure sensitive display screen in order to lock markers to the selected objects. Alternatively, one or more further embodiments are configured to receive a sequence of input signals via for example a trigger button to trigger the locking of markers to selected objects aimed at via an aim marker as described above.

The invention is not to be seen as limited by the embodiments described above, but can be varied within the scope of the appended claims, as will be readily apparent to the person skilled in the art. It is to be noted, that the features of the different embodiments described above can also be combined as suitable.

The invention claimed is:

1. A method for marking and analyzing at least one object in an IR image, the at least one object being defined by a specific temperature pattern, the method comprising:
receiving an IR image of an object scene comprising at least one object;
enabling a first user selection of a first object scene portion in the image;
generating a first input control signal in response to a single interaction with or activation of an input control unit that indicates the first user selection of the first object scene portion;
in response to the first input control signal:
selecting pixel coordinates of the first object scene portion;
locking and displaying a first marker of a camera on a first object region corresponding to said selected pixel coordinates in said object scene; and
while the camera is being moved in relation to the object scene, tracking the first object region in a sequence of image frames based on a temperature data pattern identified for said selected pixel coordinates and displaying the first marker fixed to the tracked first object region; and
during said tracking and the camera being moved, enabling a second user selection of a second object scene portion in at least one of the image frames and processing data of said sequence of image frames, whereby dynamic tracking the first object region is achieved while the second user selection is enabled.

2. The method of claim 1, further comprising:
measuring a first parameter of an object corresponding to said first marker; and
calculating a difference between said first parameter and a second parameter of a second marker on said object scene or between said first parameter and a reference value.

3. The method of claim 2, further comprising:
generating a second input control signal in response to another single interaction with or activation of the input control unit that indicates the second user selection of the second object scene portion;
in response to the second input control signal:
selecting pixel coordinates of the second selected object scene portion; and
locking and displaying the second marker of the camera on a second object region corresponding to said selected pixel coordinates of said second selected object scene portion.

4. The method of claim 3, wherein said first and second parameters are temperatures.

5. The method of claim 4, further comprising tracking the second object region in the sequence of image frames based on a temperature data pattern identified for said selected pixel coordinates of the second object scene portion and displaying the second marker fixed to the tracked second object region, in response to the second input control signal.

6. The method of claim 5, wherein said first or second marker is located at fixed pixel coordinates in an image of said camera prior to the locking and the displaying of the first or the second marker fixed to the tracked first or second object region, and is aimed by moving said camera in relation to the object scene.

7. The method of claim 6, further comprising:
receiving a third input control signal; and
storing said image and said first marker and/or second marker in response to said third input control signal.

8. The method according to claim 1, wherein:
the input control unit comprises a touch screen; and
the selecting of the pixel coordinates and the locking and displaying of the first marker are based on where the touch screen is touched.

9. A computer executable program product embodied on a non-transitory computer-readable medium comprising program code portions adapted to control a processor to perform any of the steps or functions of claim 1.

10. A computer executable program product embodied on a non-transitory computer-readable medium comprising configuration data adapted to configure a field-programmable gate array (FPGA) to perform any of the steps or functions of claim 1.

11. The method of claim 1, further comprising undoing a previous action in response to an undo control signal.

12. An infrared (IR) camera comprising:
a display configured to display, to a user, an image of an object scene comprising at least one object defined by a specific temperature pattern; and
a processing unit configured to:
enable a first user selection of a first object scene portion in the image;
generate a first input control signal in response to a single interaction with or activation of an input control unit that indicates the first user selection of the first object scene portion;
in response to the first input control signal:
select pixel coordinates of the first object scene portion;
lock and display a first marker corresponding to said selected pixel coordinates of the image shown by said display; and
while the IR camera is being moved in relation to the object scene, track the first object region in a sequence of image frames based on a temperature data pattern identified for said selected pixel coordinates, and display the first marker fixed to the tracked first object region; and
during the tracking and the IR camera being moved, enable a second user selection of a second object scene portion in at least one of the image and process data associated with said sequence of image frames, whereby dynamic tracking the first object region is achieved while the second user selection is enabled.

13. An IR camera according to claim 12, wherein said processing unit is further arranged to determine a first parameter corresponding to said first marker and calculating a difference between said first parameter and a second parameter of a second marker or said first parameter and a reference value.

14. An IR camera according to claim 13, wherein said first marker is located at fixed pixel coordinates in an image of said camera prior to the locking and the displaying of the first marker fixed to the tracked first object region, and is aimed by moving said camera in relation to the object scene.

15. An image processing system comprising an IR camera according to claim 12.

16. The IR camera of claim 12, wherein:
the input control unit comprise a touch screen implemented as part of the display; and
the processor is configured to select the pixel coordinates and to lock and display the first marker based on where the touch screen is touched.

17. The IR camera of claim 12, wherein the processing unit is further configured to:
generate a second input control signal in response to another single interaction with or activation of the input control unit that indicates the second user selection of the second object scene portion;
in response to the second input control signal:
select pixel coordinates of the second object scene portion; and
lock and display a second marker on a second object region corresponding to said selected pixel coordinates of said second object scene portion.

18. The IR camera of claim 17, wherein the processing unit is further configured to track the second object region in the sequence of image frames based on a temperature data pattern identified for said selected pixel coordinates of the second object scene portion and to display the second marker fixed to the tracked second object region, in response to the second input control signal.

19. The IR camera of claim 17, wherein the processing unit is further configured to:
receive a third input control signal; and
store said image and said first marker and/or second marker in response to said third input control signal.

20. The IR camera of claim 19, wherein said third input control signal also indicates selected pixel coordinates of a third object scene portion, and wherein the processing unit is further configured to lock a third marker on a third object region corresponding to said selected pixel coordinates.

* * * * *